United States Patent
Davies et al.

(10) Patent No.: US 10,767,603 B2
(45) Date of Patent: Sep. 8, 2020

(54) ATTACHING STRUCTURE FOR MOTOR VEHICLE, INCLUDING BRACKET WITH LOW RIGIDITY PORTION FOR VEHICLE SAFETY

(71) Applicant: Nifco Inc., Yokosuka-shi, Kanagawa (JP)

(72) Inventors: Matt Davies, Stockton-on-Tees (GB); Gavin Wilkinson, Stockton-on-Tees (GB); Steve Garrett, Stockton-on-Tees (GB)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 16/635,041

(22) PCT Filed: Jun. 29, 2018

(86) PCT No.: PCT/JP2018/024930
§ 371 (c)(1),
(2) Date: Jan. 29, 2020

(87) PCT Pub. No.: WO2019/026505
PCT Pub. Date: Feb. 7, 2019

(65) Prior Publication Data
US 2020/0248657 A1    Aug. 6, 2020

(30) Foreign Application Priority Data
Aug. 2, 2017  (GB) .................................. 1712411.6

(51) Int. Cl.
*F02M 26/12*  (2016.01)
*B60R 21/34*  (2011.01)
*B60R 21/00*  (2006.01)

(52) U.S. Cl.
CPC ............. *F02M 26/12* (2016.02); *B60R 21/34* (2013.01); *B60R 2021/0004* (2013.01)

(58) Field of Classification Search
CPC .. F02M 26/12; B60R 2021/0004; B60R 21/34
See application file for complete search history.

(56) References Cited

U.S. PATENT DOCUMENTS

| 9,518,536 B2 | 12/2016 | Sekiya et al. |
| 2003/0131594 A1 | 7/2003 | Kawamizu |
| 2015/0240751 A1* | 8/2015 | Sato ....................... F02M 26/12 60/605.2 |

FOREIGN PATENT DOCUMENTS

| JP | 2008180173 A | 8/2008 |
| JP | 2015124669 A | 7/2015 |

(Continued)

OTHER PUBLICATIONS

International Search Report for International Application No. PCT/JP2018/024930, dated Sep. 25, 2018, 3 pages.

(Continued)

*Primary Examiner* — Xiao En Mo
(74) *Attorney, Agent, or Firm* — Armstrong Teasdale LLP (57) ABSTRACT

An attaching structure for a motor vehicle includes a cylinder head; an EGR valve arranged adjacent to the cylinder head; a bracket including a first portion attached to the cylinder head, a second portion attached to the EGR valve, and a low rigidity portion arranged between the first portion and the second portion, the low rigidity portion having a rigidity less than remaining portions of the bracket; and a vehicle component arranged adjacent to the EGR valve. The low rigidity portion is formed to break when the EGR valve receives a shock load from the vehicle component.

7 Claims, 9 Drawing Sheets

(56) References Cited

FOREIGN PATENT DOCUMENTS

JP  2017081503 A  5/2017
WO  2013054711 A1  4/2013

OTHER PUBLICATIONS

Written Opinion of the International Searching Authority for International Application No. PCT/JP2018/024930, dated Sep. 25, 2018, 3 pages.

* cited by examiner

ATTACHING STRUCTURE FOR MOTOR VEHICLE, INCLUDING BRACKET WITH LOW RIGIDITY PORTION FOR VEHICLE SAFETY

CROSS-REFERENCE TO RELATED APPLICATIONS

This application is a U.S. National Phase Application of PCT/JP2018/024930, filed Jun. 29, 2018, which claims the benefit of priority to GB Application No. 1712411.6, filed Aug. 2, 2017, the contents of which are hereby expressly incorporated by reference in their entirety.

TECHNICAL FIELD

The present invention relates to an attaching structure for connecting an exhaust gas recirculation valve (hereinafter "EGR valve") to an engine cylinder head of a motor vehicle. More specifically, the present invention relates to a bracket having a low rigidity portion so that when a front end collision occurs, the bracket breaks at the low rigidity portion to prevent the EGR valve from pushing a brake booster and a master cylinder assembly (hereinafter "brake booster") into a cabin of the motor vehicle causing an injury to the driver.

BACKGROUND ART

A conventional motor vehicle with an internal combustion engine generally includes a cylinder head, an EGR valve for recirculating a portion of an exhaust gas from the internal combustion engine back to engine cylinders to reduce emission of nitrogen oxide, a bracket for connecting the EGR valve to the cylinder head, and brake system components such as a brake booster.

For efficient utilization of the engine space, in some of the conventional motor vehicles, the EGR valve is arranged in front of the brake booster and aligned with the brake booster in a front-rear direction of the motor vehicle. Thus, the brake booster is arranged between the EGR valve and the cabin of the motor vehicle in the front-rear direction of the motor vehicle.

SUMMARY OF INVENTION

Technical Problem

A conventional bracket is formed from metal for high rigidity and reliability. However, there was an unexpected issue due to the metal brake booster being arranged between the EGR valve and the cabin of the motor vehicle in the front-rear direction of the motor vehicle. If the motor vehicle having such a configuration was involved in a front end collision, an impact force from the collision moves the engine rearward causing the EGR valve connected to the cylinder head through the bracket to move along with the engine. The EGR valve collides with the brake booster, and then, the brake booster moves along with the EGR valve and collides with the driver inside the cabin, causing a major injury to the driver.

Therefore, to prevent the brake booster from entering the cabin and causing a major injury to the driver, a breakable bracket was conceived. In an attempt to form a breakable bracket, a hybrid bracket was formed in which the bracket was formed from a resin bracket part fixing the EGR valve, an aluminum bracket part fixing the resin bracket part, and the metal bracket part fixing the aluminum bracket. When the front end collision occurred, the EGR valve moves rearward with the engine. After the EGR valve collides with the brake booster, the brake booster applies a shock load to the EGR valve. The shock load was transferred from the EGR valve to the hybrid bracket, causing the resin bracket part to break so that the brake booster was prevented from entering the cabin. However, the manufacturing cost of the hybrid bracket was expensive; thus, a design with better cost efficiency was required.

Therefore, the present invention has an object to form a bracket capable of absorbing the impact force generated from the front end collision to prevent the brake booster from entering the cabin and causing a major injury to the driver, and having a cost efficient design reducing the manufacturing cost.

Solution to Problem

In the present embodiment, a bracket formed entirely from a resin is provided for better cost efficiency. The bracket reliably breaks during the vehicle collision to prevent the brake booster from entering the cabin of the motor vehicle. More specifically, a body portion of the bracket includes a first portion attached to the cylinder head, a second portion attached to the EGR valve, and a low rigidity portion arranged between the first portion and the second portion. The low rigidity portion has a rigidity less than remaining portions of the body portion of the bracket. When the EGR valve receives a shock load from the vehicle component such as a brake booster, the body portion breaks at the low rigidity portion.

According to such configuration, the bracket will not break during a normal operation of the motor vehicle, but will break at the low rigidity portion from the collision to absorb the shock load, thereby, the brake booster is prevented from entering the cabin and injuring the driver. More specifically, the bracket is formed to have a resonant frequency greater than the most severe natural frequency of the engine, and the low rigidity portion is formed to break when a force greater than 15 kN is applied.

Other features of the present embodiment will become apparent from the following detailed description and the scope of patent claims taken in conjunction with the accompanying drawings.

DESCRIPTION OF EMBODIMENTS

Hereinafter, the present embodiment is explained based on the drawings. In an explanation, terms indicating the directions follow the directions shown by a direction key. However, an arrangement of a bracket according to the present embodiment is not limited to the aforementioned directions.

Figure 7:
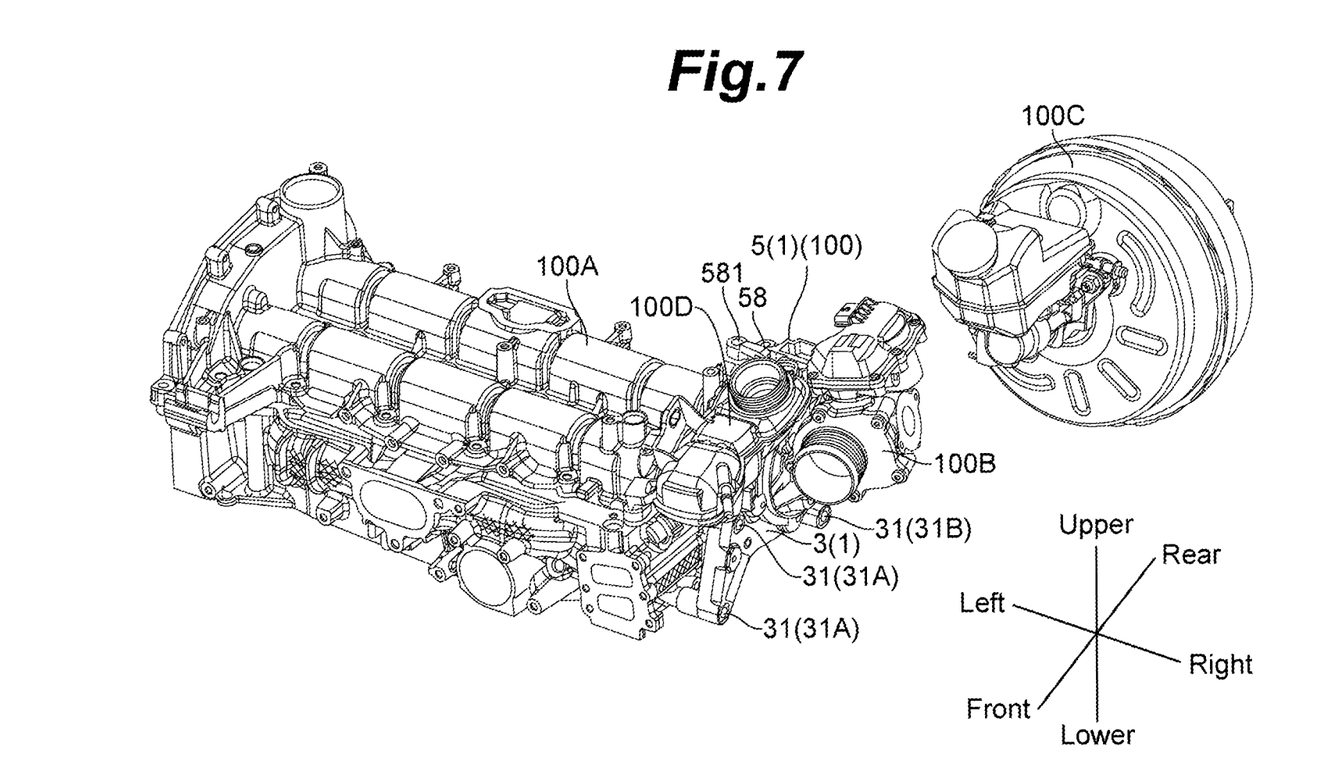
FIG. 7 illustrates a positional relationship between a brake booster and the bracket of the present embodiment attached to a cylinder head and the EGR valve from a perspective view during a normal operation.
Figure 8:
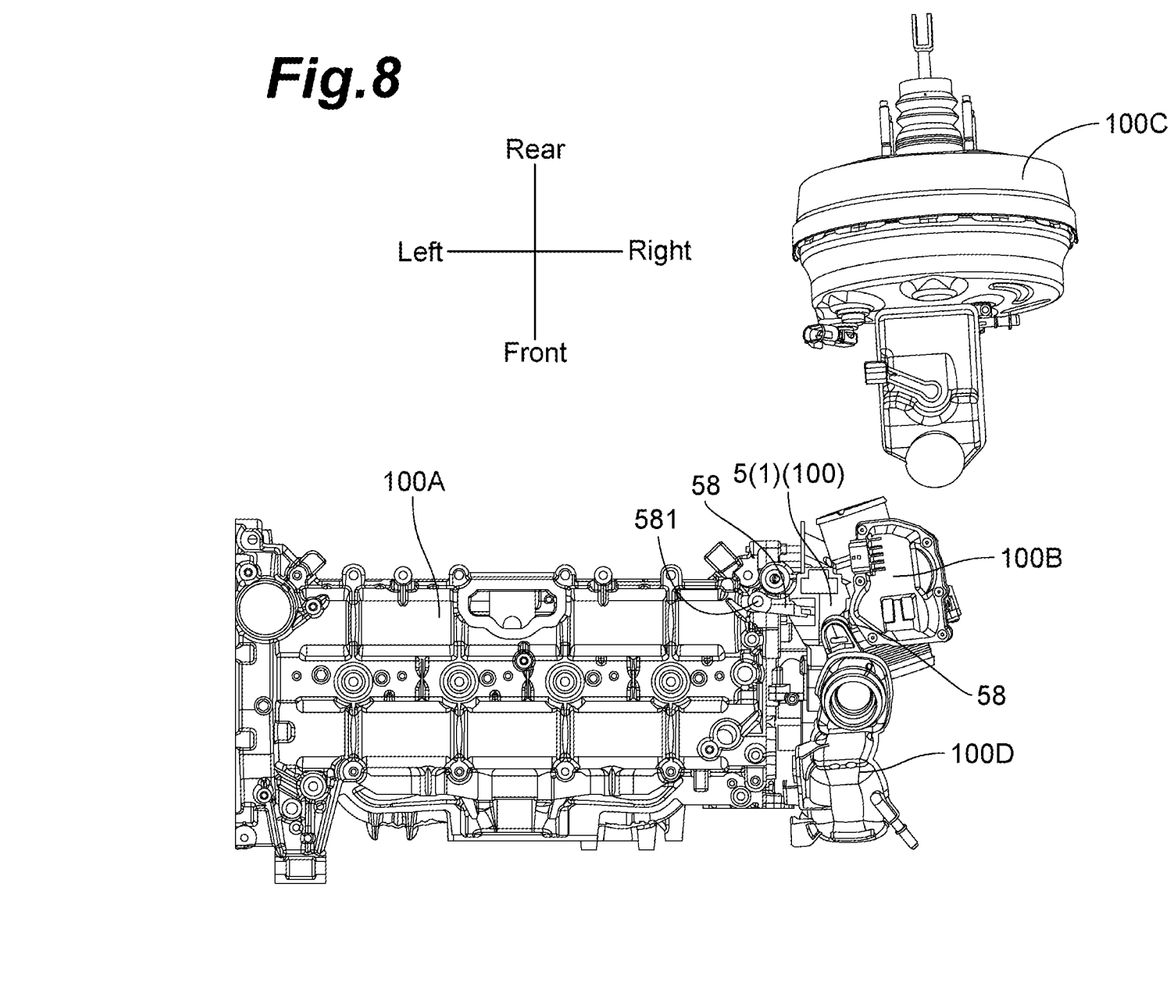
FIG. 8 illustrates a positional relationship between the brake booster and the bracket of the present embodiment attached to the cylinder head and the EGR valve from a plan view during a normal operation.

A bracket 100 of the present embodiment is attached to a cylinder head 100A of the motor vehicle and supports an EGR valve 100B, as shown in FIGS. 7 and 8. A body portion 1 of the bracket 100 is formed entirely from a resin. As shown in FIGS. 1-3 and 7, the body portion 1 includes a main cylinder head connecting portion 3 (first portion) to connect to the cylinder head 100A, an EGR valve connecting portion 5 (second portion) to connect to the EGR valve 100B, and a low rigidity portion 7 formed between the main cylinder head connecting portion 3 and the EGR valve connecting portion 5. FIGS. 7 and 8 show the EGR valve 100B connected to a right side of the body portion 1, and the cylinder head 100A connected to a left side of the body portion 1.

Figure 1:
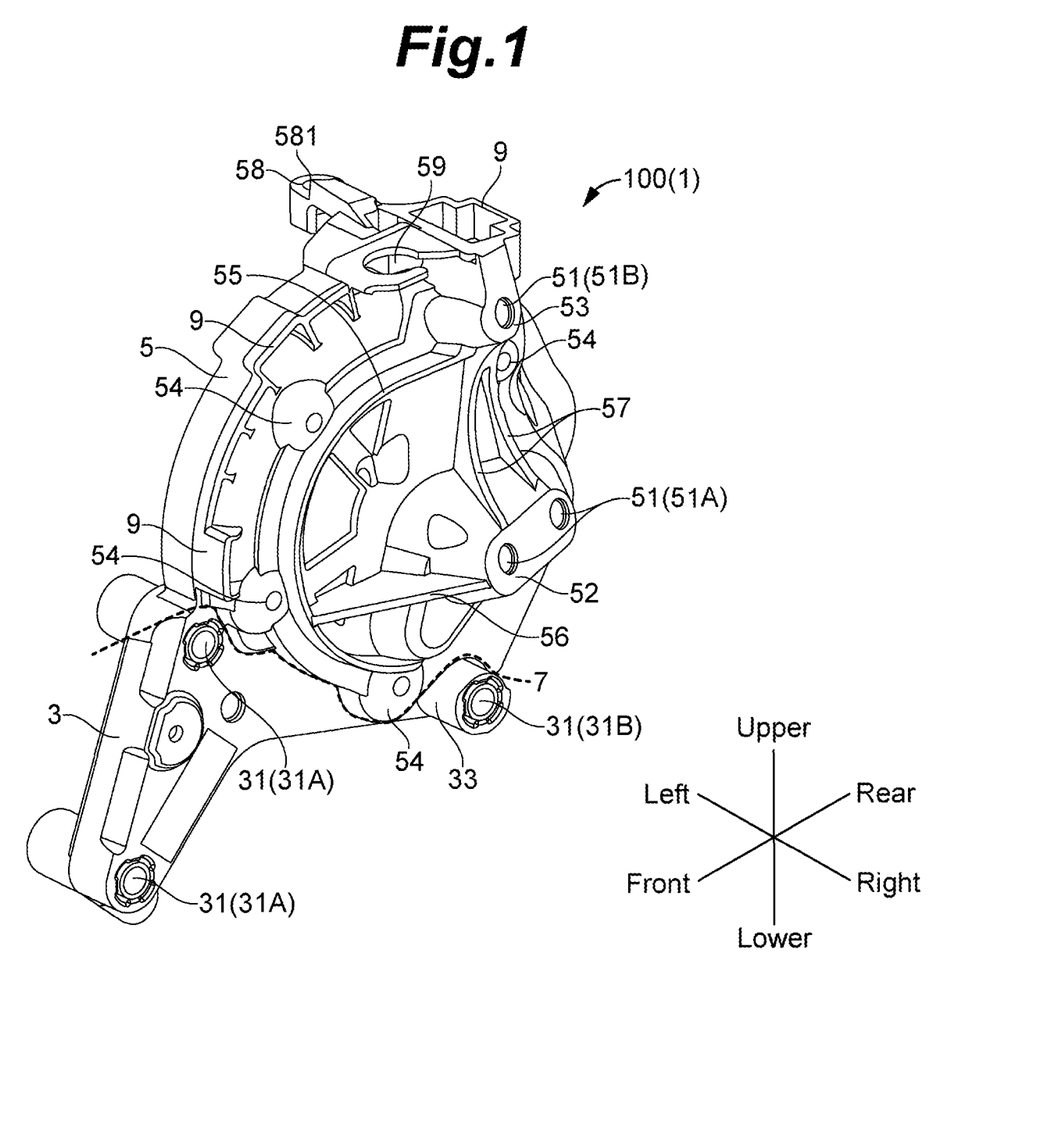
FIG. 1 is a perspective view of a bracket of the present embodiment.

As shown in FIG. 1, the main cylinder head connecting portion 3 is arranged at a lower section of the body portion 1. The main cylinder head connecting portion 3 includes first apertures 31 to connect to the cylinder head 100A. More specifically, in the present embodiment, the main cylinder head connecting portion 3 has three first apertures 31 spaced apart from each other, wherein the two first apertures 31A are arranged toward the front of the body portion 1 and one first aperture 31B is arranged toward the rear of the body portion 1. The one first aperture 31B is formed on a rear protruding portion 33 protruding toward the right of the body portion 1. Fasteners such as bolts are used to connect the body portion 1 to the cylinder head 100A through the three first apertures 31.

Figure 5:
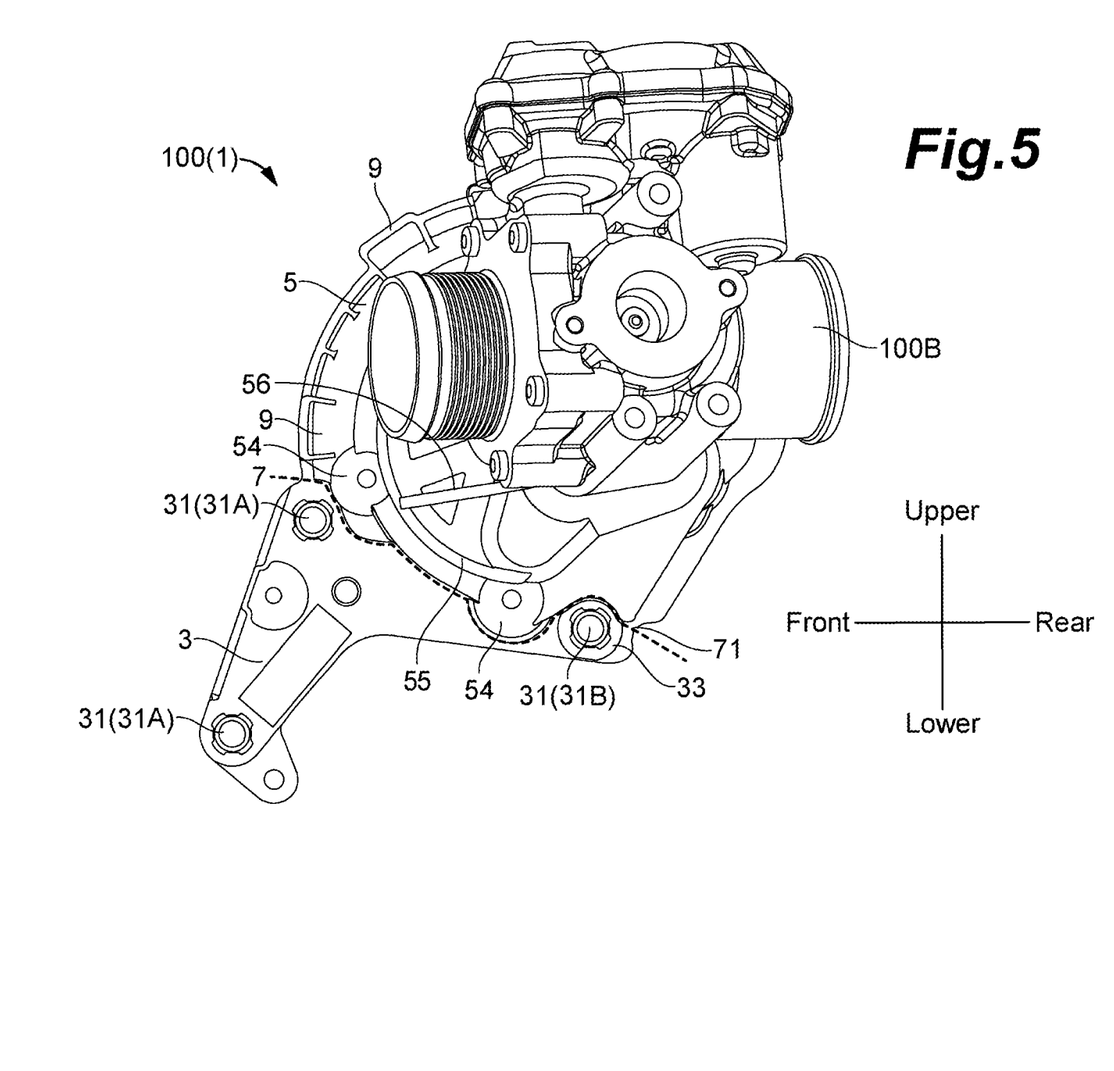
FIG. 5 is a right view of the bracket of the present embodiment attached with an EGR valve.

As shown in FIG. 1, the EGR valve connecting portion 5 is arranged at an upper section of the body portion 1 of the bracket 100. The EGR valve connecting portion 5 has second apertures 51 to connect the EGR valve 100B on the right side of the body portion 1 as shown in FIG. 5. More specifically, in the present embodiment, as shown in FIG. 1, the EGR valve connecting portion 5 has three second apertures 51, wherein two second apertures 51A are formed at a relatively middle portion of the EGR valve connecting portion 5, and one second aperture 51B is formed at an upper section of the EGR valve connecting portion 5 and spaced apart from the two second apertures 51A.

As shown in FIG. 1, the two second apertures 51A are formed on a center protruding portion 52 protruding toward the right of the body portion 1. The second aperture 51B is formed on an upper protruding portion 53, which is also protruding from the body portion 1 toward the right of the body portion 1.

As shown in FIG. 1, between the upper protruding portion 53 and the center protruding portion 52, an EGR valve rib portion 57 is formed. The EGR valve rib portion 57 is formed to increase the rigidity of the EGR valve connecting portion 5 and has a concave shape to fit the EGR valve 100B as shown in FIGS. 1 and 5.

To further increase the rigidity of the EGR valve connecting portion 5, an arc-shaped rib portion 55 and a radial rib portion 56 are formed. The arc-shaped rib portion 55 extends from the upper protruding portion 53 to the lower section of the EGR valve connecting portion 5. The radial rib portion 56 extends from the center protruding portion 52 to the arc-shaped rib portion 55.

Figure 2:
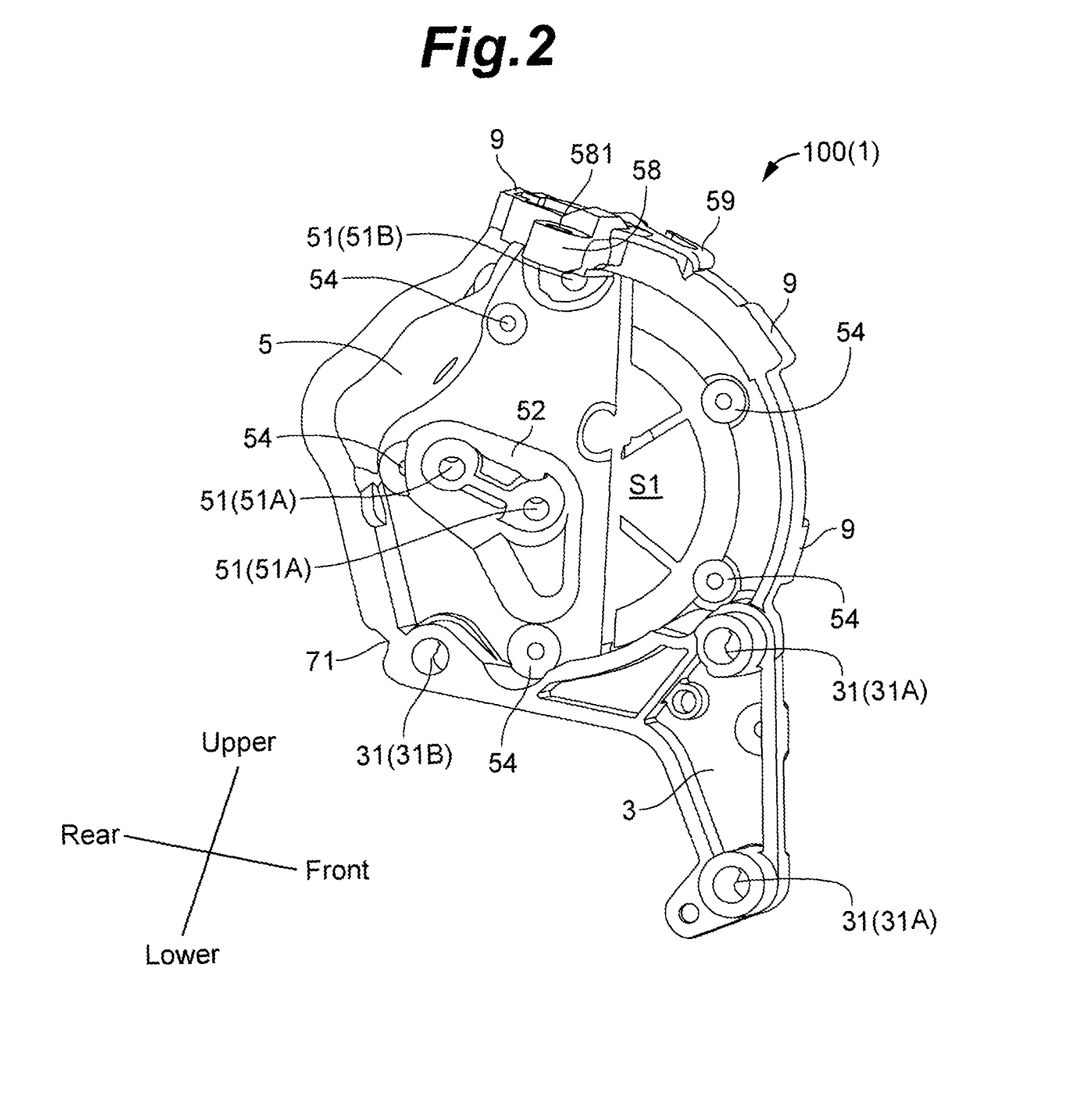
FIG. 2 is another perspective view thereof.

The EGR valve connecting portion 5 is also formed to house a conventional vacuum pump (not shown) on the left side. As shown in FIG. 2, the EGR valve connecting portion 5 is formed with a vacuum pump space S1 on the left side of the EGR valve connecting portion 5 to house the vacuum pump.

Figure 3:
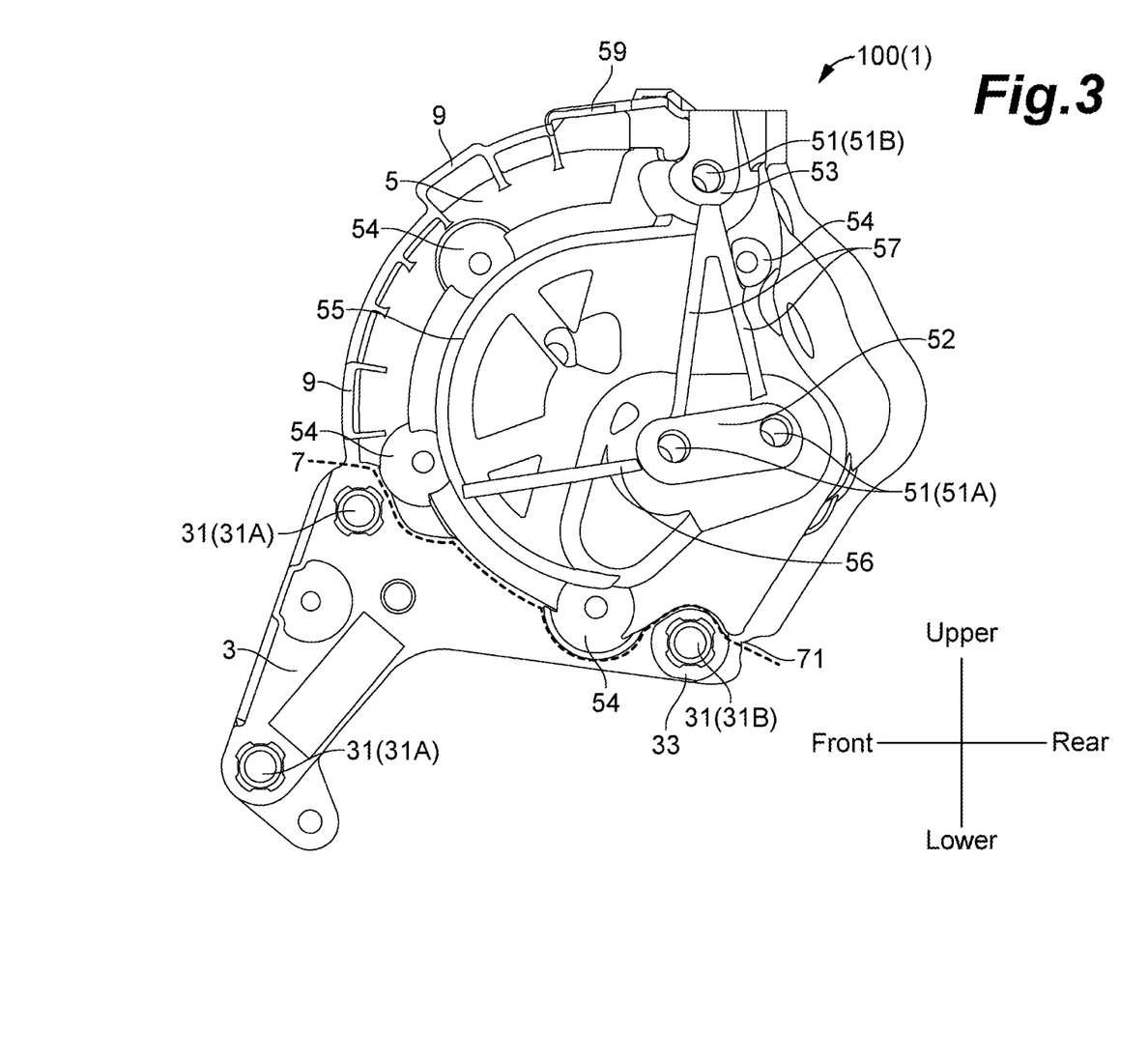
FIG. 3 is a right side view thereof.

Further, as shown in FIGS. 1-3, a plurality of fastener housing portions 54 is formed on the EGR valve connecting portion 5 for providing clearance for fastener heads of the vacuum pump. More specifically, in the present embodiment, five fastener housing portions 54 are formed on the EGR valve connecting portion 5 wherein one of the five fastener housing portion 54 is formed integrally with the center protruding portion 52 and cannot be viewed from the right side of the body portion 1 as shown in FIGS. 1-3. In addition to housing the fastener heads of the vacuum pump, the plurality of fastener housing portions 54 increases the rigidity of the EGR valve connecting portion 5.

Figure 4:
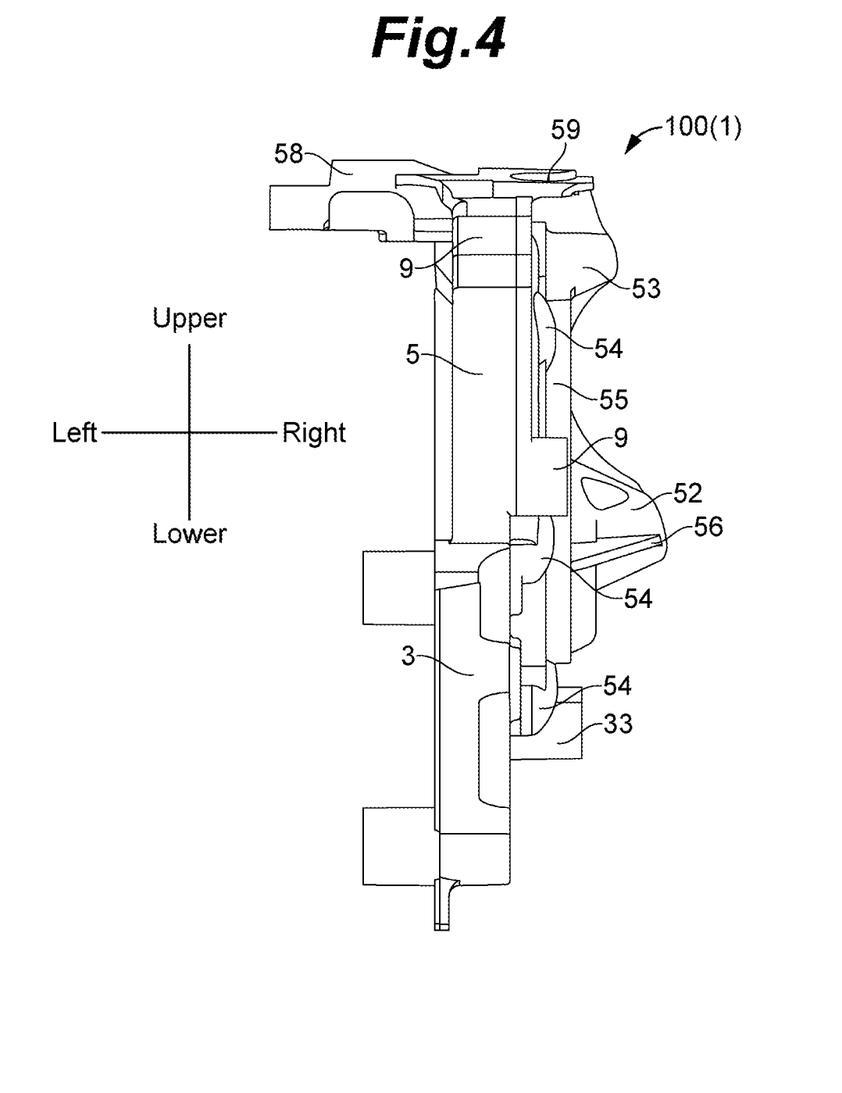
FIG. 4 is a front view thereof.

FIGS. 1 and 4 show an upper side of the EGR valve connecting portion 5 including a secondary cylinder head connecting portion 58 extending toward the left of the body portion 1 to connect to an upper part of the cylinder head 100A. The secondary cylinder head connecting portion 58 includes a through-hole 581 for receiving a fastener, such as a bolt, to connect the body portion 1 to the cylinder head 100A. As shown in FIG. 6B, the secondary cylinder head connecting portion 58 is configured to break when the collision occurs.

The upper side of the EGR valve connecting portion 5 also includes a hook portion 59 extending toward the right of the body portion 1, as shown in FIG. 1. As shown in FIGS. 7 and 8, the hook portion 59 is configured to engage another part such as a coolant expansion reservoir 100D to reduce a transmission of noise and vibration.

As shown in FIGS. 1-5, a periphery of the EGR valve connecting portion 5 includes multiple engaging portions 9 wherein fasteners, such as clip members, engage the engaging portions 9 to support wires for sensors.

Between the main cylinder head connecting portion 3 and the EGR valve connecting portion 5, the low rigidity portion 7 is formed so that when the front end collision occurs, the body portion 1 breaks at the low rigidity portion 7 to absorb the impact force and preventing the brake booster 100C from entering the cabin of the motor vehicle, see FIGS. 1 and 3.

In order for the low rigidity portion 7 to reliably break during the collision, the low rigidity portion 7 has a thickness less than the remaining portions of the body portion 1 so that the rigidity of the low rigidity portion 7 is less than that of the remaining portions of the body portion 1. In other words, the low rigidity portion 7 is a groove extending along a boundary between the main cylinder head connecting portion 3 and the EGR valve connecting portion 5. The low rigidity portion 7 is formed along the broken line shown in FIGS. 1, 3, and 5.

The low rigidity portion 7 is formed to have a rigidity, which will not break during a normal operation of the motor vehicle, but will break with a specific shock load during the vehicle collision to avoid injury to the driver in the cabin. More specifically, the low rigidity portion 7 is formed to break when a force greater than 15 kN is applied.

In addition, as shown in FIG. 3, an initial breaking portion 71 is formed on the body portion 1 where the body portion 1 initially breaks from the shock load. More specifically, the initial breaking portion 71 is a notch formed continuously to the low rigidity portion 7 at an edge of the body portion 1 on a rear section between the EGR valve connecting portion 5 and the rear protruding portion 33 as shown in FIG. 3.

Figure 6A:
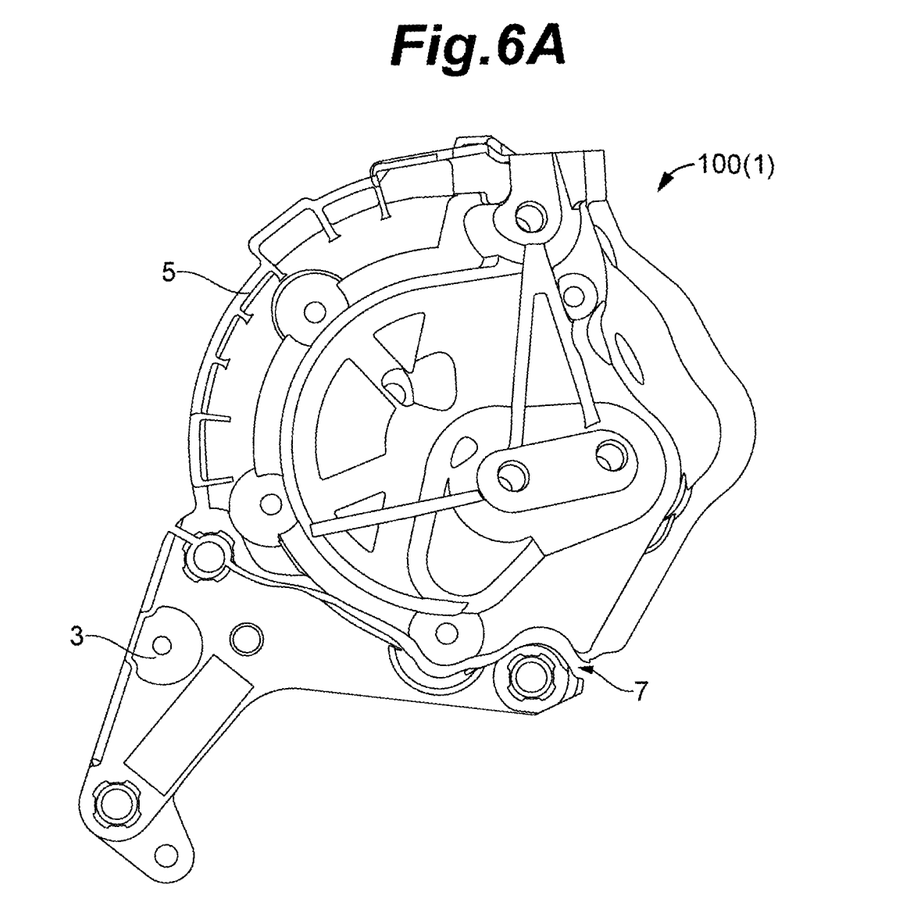
FIG. 6A is a right side view of the bracket of the present embodiment in the broken state.
Figure 6B:
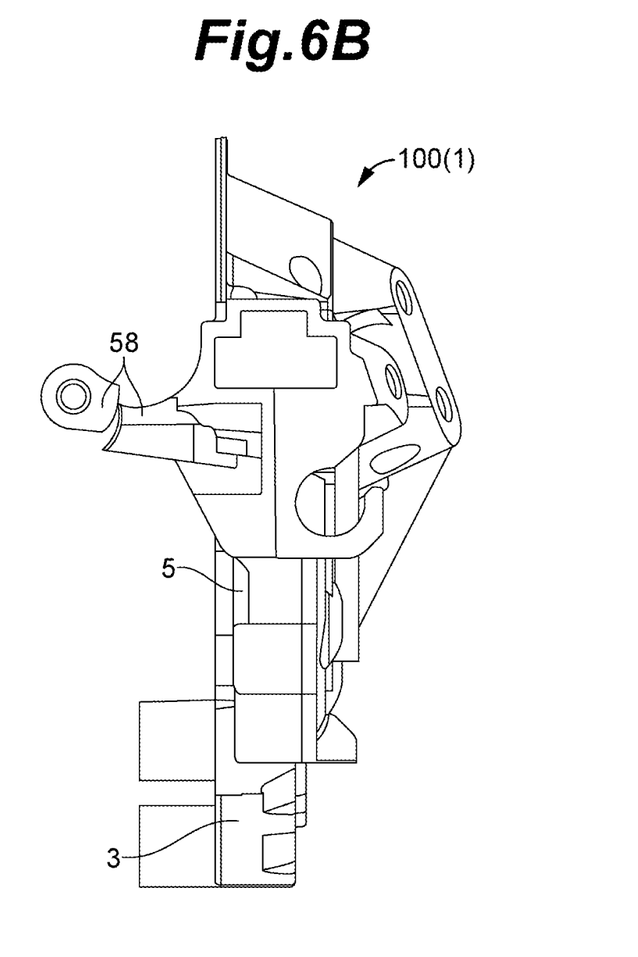
FIG. 6B is a plan view of the bracket of the present embodiment in the broken state.

FIGS. 6A and 6B are provided as one example to show the status of the bracket 100 after the front end collision. As shown in FIG. 6A, the bracket 100 breaks substantially along the low rigidity portion 7 to absorb the impact force from the front end collision. As shown in FIG. 6B, the secondary cylinder head connecting portion 58 of the EGR valve connecting portion 5 is also broken.

Therefore, when the front end collision occurs, an impact force from the collision moves the cylinder head 100A rearward, and the EGR valve 100B connected to the cylinder head 100A through the bracket 100 also moves rearward. The EGR valve 100B collides with the brake booster 100C, and in resistance against the impact force from the EGR valve 100B, a shock load is applied from the brake booster 100C to the EGR valve 100B. The shock load is transferred to the bracket 100. The bracket 100 receives the shock load causing the secondary cylinder head connecting portion 58 and the low rigidity portion 7 of the body portion 1 to break. The EGR valve 100B breaks away from the bracket 100, so that the brake booster 100C is prevented from entering inside the cabin of the motor vehicle. Thus, the injury to the driver of the motor vehicle is prevented.

The above description simply illustrates the principle of the invention. Furthermore, a great number of modifications and alterations are possible for those skilled in the art, and the invention not being limited to the heretofore illustrated and described exact configurations and applications, all corresponding modification examples and equivalents are deemed to be within the scope of the invention defined by the attached claims and their equivalents.

For example, in the heretofore described, a description has been given of a case in which the EGR valve connecting portion 5 has a single radial rib portion 56, but the invention not limited to this, the EGR valve connecting portion 5 may have any number of radial rib portions 56 to increase the rigidity.

In the heretofore described, a description has been given of a case in which the main cylinder head connecting portion 3 has three first apertures 31, but the invention not limited to this, the main cylinder head connecting portion 3 may have any number of first apertures 31 to connect to the cylinder head 100A. Similarly, the EGR valve connecting portion 5 may have any number of second apertures 51 to connect to the EGR valve 100B.

The invention claimed is:

1. An attaching structure for a motor vehicle, comprising:
   a cylinder head;
   an EGR valve arranged adjacent to the cylinder head;
   a bracket including
      a first portion attached to the cylinder head,
      a second portion attached to the EGR valve, and
      a low rigidity portion arranged between the first portion and the second portion, the low rigidity portion having a rigidity less than remaining portions of the bracket; and
   a vehicle component arranged adjacent to the EGR valve,
   wherein the low rigidity portion is configured to break when the EGR valve receives a shock load from the vehicle component.

2. The attaching structure according to claim 1, wherein the bracket further comprises an initial breaking portion where the bracket initially breaks from the shock load.

3. The attaching structure according to claim 2, wherein the initial breaking portion is a notch formed continuously to the low rigidity portion.

4. The attaching structure according to claim 3, wherein the low rigidity portion is a groove.

5. The attaching structure according to claim 4, wherein the vehicle component is a brake booster of the motor vehicle.

6. The attaching structure according to claim 5, wherein the bracket is configured to break at the low rigidity portion so that a distance between the cylinder head and the EGR valve changes to absorb the shock load from the brake booster.

7. The attaching structure according to claim 1, wherein the bracket is formed of a resin.

* * * * *